Dec. 8, 1931.  W. J. JENKINS ET AL  1,835,710
MULTIPLE NUT HOLDING PLATE
Filed Jan. 2, 1931
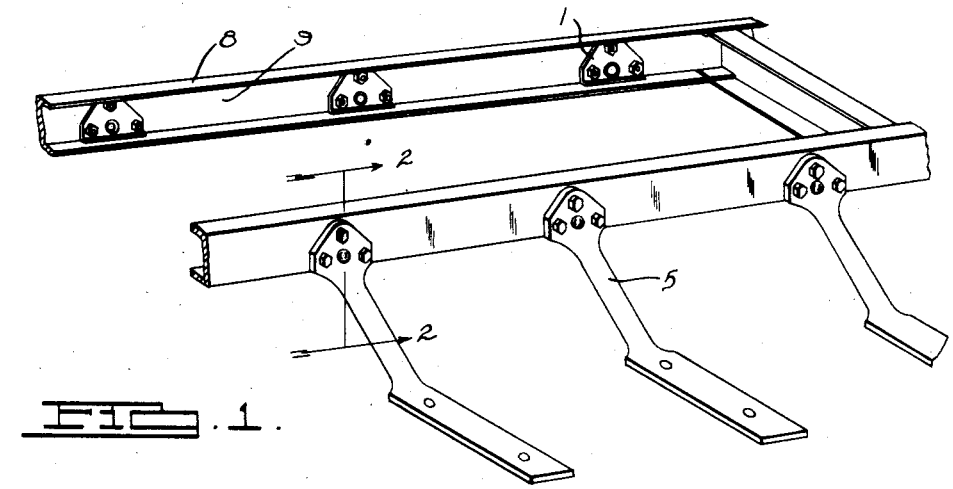
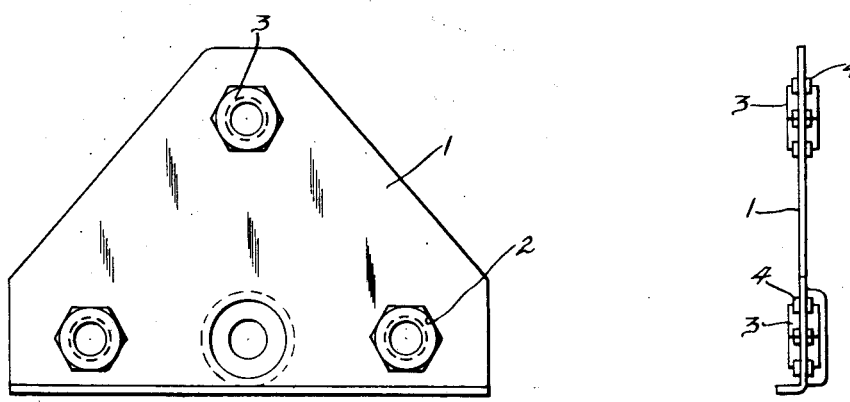
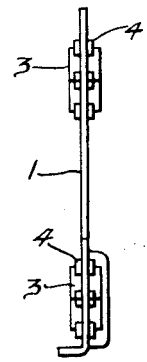
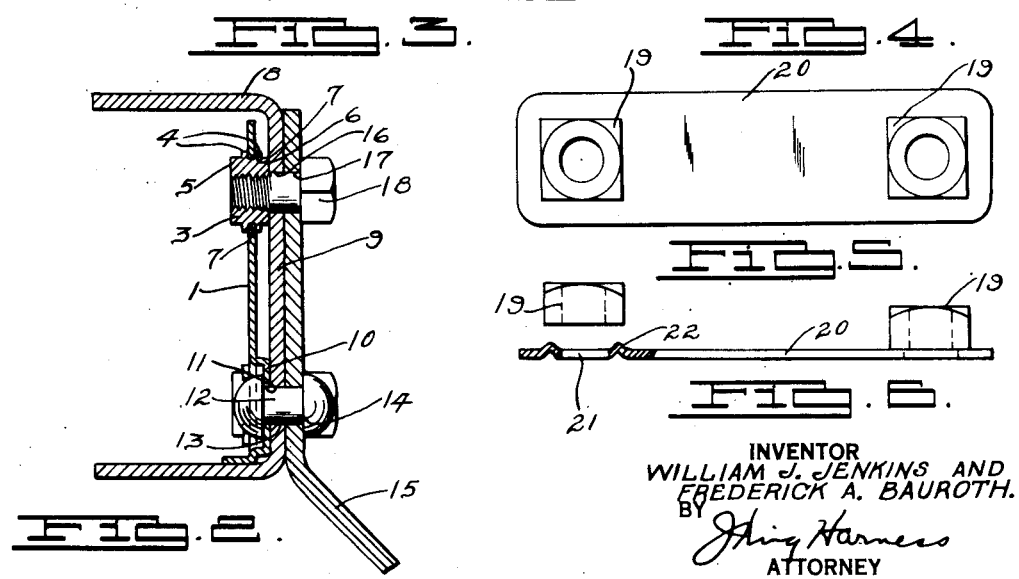
INVENTOR
WILLIAM J. JENKINS AND
FREDERICK A. BAUROTH.
BY
ATTORNEY Patented Dec. 8, 1931

1,835,710

UNITED STATES PATENT OFFICE

WILLIAM J. JENKINS AND FREDERICK A. BAUROTH, OF DETROIT, MICHIGAN, ASSIGNORS TO CHRYSLER CORPORATION, OF DETROIT, MICHIGAN, A CORPORATION OF DELAWARE

MULTIPLE NUT HOLDING PLATE

Application filed January 2, 1931. Serial No. 506,295.

This invention relates to an improved method and means for holding a plurality of nuts in registration with apertures in a structure in conjunction with which such nuts are employed.

The main objects of the invention are to provide improved means for securing a plurality of nuts to a support; to provide means of this kind which are conveniently formed from the stock of the nuts without requiring the consumption of more metal than is customary in the production of nuts; to provide a supporting structure for holding a plurality of nuts, which are employed in an inaccessible position, against rotation and in registration with the apertures through which extend the bolts that are received by the nuts; and to provide means of this kind which are particularly adapted for use in vehicle chassis construction.

Further objects of the invention are to provide an improved method for utilizing the corner portions of a polygonal shaped nut for attaching the latter to a multiple nut holding plate; to provide a method of this character by which nuts of conventional shapes are rigidly attached to a supporting plate and held against rotation relative thereto; and to provide a method of this character which involves only simple and inexpensive punching or deforming operations and tools.

An illustrative embodiment of the invention is shown in the accompanying drawings, in which:

Fig. 1 is a fragmentary perspective view of a vehicle chassis frame illustrating one application of our improved multiple nut holding plate.

Fig. 2 is a transverse vertical section taken on the line 2—2 of Fig. 1.

Fig. 3 is a side elevation of a nut holding plate showing several nuts mounted thereon.

Fig. 4 is a side elevation of the plate shown in Fig. 3.

Fig. 5 is a plan view of a modified form of the invention.

Fig. 6 is a side elevation, partly in section, of the structure shown in Fig. 5.

In the form shown, our improved multiple nut holding device includes a plate 1 in which are formed spaced hexagonal apertures 2 through which hexagonal shaped nuts 3 extend. The thickness of the plate is located between the opposite extremities of the nuts 3 and the corner portions 4 of the nuts are upset or crushed inwardly from the respectively opposite extremities 5 and 6 of each nut and burred over upon the side faces of the plate 1. The upset corner portions extend outwardly radially from the central axis of the nut and overlap the perimeters of the openings 2 forming small flanges or lugs which bear upon the opposite sides of the plate from respectively opposite directions and firmly attach the nuts to the plate. The conforming shape of the apertures 2 and the intermediate portions 7 of the nuts, prevent relative rotation thereof with respect to the plate.

Nuts of hexagonal, rectangular or any polygonal shape may be secured to a multiple nut holding plate in the above manner, the disclosure of only hexagonal nuts being used for illustrative purposes, and in each case the aperture in the holding plate is formed to conform in shape with and closely fit the nuts. Upsetting of the corner portions may be conveniently accomplished by a punching operation with the aid of a suitable tool (not shown) having a recess for receiving the main portion of the nut and a shoulder for crushing only the corner portions thereof. In securing hexagonal nuts of the type shown in the drawings to a plate, a pair of tools (not shown) each having a cylindrical recess equal in diameter to the distance between the opposite side faces of the nuts are placed upon the opposite extremities of each nut and driven inwardly with sufficient force to crowd the metal at the corner portions of the nut inwardly upon the opposite sides of the plate, as shown in Figs. 2 and 4.

Multiple nut holding plates of this kind are particularly useful in vehicle chassis constructions in which channel shape side members 8 having an intermediate web 9 are employed. The nut holding plates are provided with at least one boss 10 which extends outwardly from one side of the plate substantially as far as the corresponding extremities of the nut protrude beyond that side of the plate. This boss is provided with an aperture 11 for receiving a rivet 12 which extends through registering apertures 13 and 14 in the web 9 of the side member 8 and in an outrigger or thread pan supporting arm 15. The rivet 12 secures the plate 1 to the side member 9 of the chassis frame and holds the nuts 3 thereof in registration with registering apertures 16 and 17 in the web 9 and outrigger 15 through which a bolt 18 is extended. The extremity 6 of each nut is held by the plate 1 in abutting relationship to the inner side of the web 9 so that when the bolts are inserted through the registering apertures 16 and 17 in the web and outrigger, respectively, they are immediately received by the nuts and the bolt may be tightened without holding the nuts against displacement or rotation.

By employing the above method, nuts of conventional construction may be employed in multiple nut holding devices of this kind and it is not necessary to provide the nuts with additional stock in order to secure them in place. The type of tools used in forming the corner portions of the nut are simple in construction and although they may be inexpensively replaced, if necessary, they are in general, subject to but slight wear and have a life of substantial length.

In the form shown in Figs. 5 and 6, a pair of nuts 19 are rigidly secured by projection welding to a supporting plate 20 with their central threaded passages in registration with apertures 21 in the plate. Before the nuts are applied to the plate 20, projections 22 are formed on one side thereof in close proximity to the edges of the apertures 21, preferably by indenting the opposite side of the plate. Then the nuts and plate are each electrically connected with a different terminal of an electric circuit and nuts are seated upon the projections. As the current passes through the projection, they are fused to the nuts with which they contact.

Although but several specific embodiments of this invention have here been shown and described, it will be understood that various changes in the size, shape and arrangement of parts may be made without departing from the spirit of our invention and it is not our intention to limit its scope other than by the terms of the appended claims.

What we claim is:

1. A supporting plate having an aperture therein, and a nut extending through said aperture having upset corner portions bearing against the respectively opposite sides of said plate.

2. A supporting plate having an aperture therein, and a nut extending through said aperture having upset corner portions extending outwardly beyond the perimeter of said aperture on respectively opposite sides of said plate.

3. A multiple nut holding plate having spaced polygonal shaped apertures therein, polygonal shaped nuts, one extending through each of said apertures, and radial flanges on the corner portions of said nuts clamped upon the respectively opposite sides of said plate.

4. A multiple nut holding plate having spaced polygonal shaped apertures therein, polygonal shaped nuts, one extending through each of said apertures, and a pair of radial flanges on each corner portion of said nuts one on each side of said plate.

5. A multiple nut holding plate having spaced polygonal shaped apertures, polygonal shaped nuts, one extending through each of said apertures respectively and having protruding portions of substantially equal lengths on one side of said plate, means on said plate protruding from the latter side thereof for securing said plate in spaced relation to a structure with the protruding extremities of said nuts abutting said structure, and upset corner portions on said nuts engaging the respectively opposite sides of said plate for securing said nuts against displacement.

6. The method of holding a nut in registration with a bolt receiving recess of a structure which consists in inserting a portion of the nut through an aperture of a plate, upsetting the corner portions of the nut from their respectively opposite extremities so as to secure the nut against displacement from said plate, and attaching the plate to said support.

7. The method of securing a nut to a holding plate which consists in forming an aperture in said plate which corresponds in shape to the cross section of said nut, inserting the nut into said aperture, and crushing the metal of the corner portions of said nut inwardly from the opposite extremities thereof upon the respectively opposite sides of said plate.

WILLIAM J. JENKINS.
FREDERICK A. BAUROTH.